United States Patent
Schindler et al.

(10) Patent No.: US 12,449,518 B2
(45) Date of Patent: Oct. 21, 2025

(54) METHOD AND DEVICE FOR IDENTIFYING CONTAMINATION ON A PROTECTIVE SCREEN OF A LIDAR SENSOR

(71) Applicants: Mercedes-Benz Group AG, Stuttgart (DE); Robert Bosch GmbH, Stuttgart (DE)

(72) Inventors: Philipp Schindler, Karlsruhe (DE); Andreas Scharf, Stuttgart (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 437 days.

(21) Appl. No.: 18/000,988

(22) PCT Filed: Jun. 2, 2021

(86) PCT No.: PCT/EP2021/064777
§ 371 (c)(1),
(2) Date: Dec. 7, 2022

(87) PCT Pub. No.: WO2021/249845
PCT Pub. Date: Dec. 16, 2021

(65) Prior Publication Data
US 2023/0213630 A1 Jul. 6, 2023

(30) Foreign Application Priority Data
Jun. 9, 2020 (DE) ...................... 10 2020 115 252.3

(51) Int. Cl.
*G01S 7/497* (2006.01)
*G01S 17/931* (2020.01)

(52) U.S. Cl.
CPC ............ *G01S 7/497* (2013.01); *G01S 17/931* (2020.01); *G01S 2007/4977* (2013.01)

(58) Field of Classification Search
CPC .......... G01S 2007/4977; G01S 17/497; G01S 17/931; G01S 7/497
(Continued)

(56) References Cited

U.S. PATENT DOCUMENTS

| 10,317,534 B2 | 6/2019 | Eshel et al. |
| 2008/0210881 A1 | 9/2008 | Harris et al. |
| 2019/0107609 A1 | 4/2019 | Kajiyama et al. |

FOREIGN PATENT DOCUMENTS

| DE | 102012112987 B3 | 12/2013 | |
| DE | 102012021830 A1 * | 5/2014 | ........... G01S 7/4873 |

(Continued)

OTHER PUBLICATIONS

Kohler et al., DE 10 2012 021 830 A1, "Optoelectronic detection device with adjustable bias voltage of an avalanche transducer", Date published: May 8, 2014 (Year: 2014).*

(Continued)

*Primary Examiner* — John H Le
(74) *Attorney, Agent, or Firm* — Marshall & Melhorn, LLC

(57) ABSTRACT

A method and device for identifying contamination on a protective screen of a lidar sensor may involve determining a sector background noise in a particular sector of a detection region of the lidar sensor and a detection region background noise is determined in a remaining detection region or the entire detection region. Contamination in the sector in question is then determined if the sector background noise is significantly lower than the detection region background noise. Alternatively, or additionally, a sector background noise is determined in the sector in question at different sensitivities of a receiver of the lidar sensor, and contamination in the sector in question is then determined if a sector background noise determined with a higher sensi- (Continued)

tivity is not significantly higher than a sector background noise determined with a lower sensitivity.

12 Claims, 2 Drawing Sheets

(58) Field of Classification Search
USPC .......................................................... 702/69
See application file for complete search history.

(56) References Cited

FOREIGN PATENT DOCUMENTS

| JP | H09042916 A | 2/1997 |
| JP | 2002062352 A | 2/2002 |
| JP | 2004271404 A | 9/2004 |
| JP | 2009503486 A | 1/2009 |
| JP | 2017181105 A | 10/2017 |
| JP | 2020076589 A | 5/2020 |

OTHER PUBLICATIONS

European Patent Office, International Search Report in Application No. PCT/EP2021/064777, dated Sep. 10, 2021, 11 pages, Rijswijk, Netherlands.
German Patent and Trademark Office, Office Action in Application No. DE 10 2020 115 252.3 dated Feb. 23, 2021, 6 pages.
Japan Patent Office, Office Action in Application No. JP2022575345, dated Aug. 22, 2023, 3 pages.
Korean Intellectual Property Office, Office Action in Application No. KR1020227046304, dated May 20, 2025, 13 pages.

* cited by examiner

METHOD AND DEVICE FOR IDENTIFYING CONTAMINATION ON A PROTECTIVE SCREEN OF A LIDAR SENSOR

FIELD

The invention concerns a method for identifying contamination on a protective screen of a Lidar sensor.

The invention further concerns a device for identifying contamination on a protective screen of a Lidar sensor and an application of such a device on a vehicle and/or robot.

BACKGROUND

DE 199 48 252 A1 discloses a method for status determination by a system for automatic lengthwise and lateral control of a vehicle, working according to the Lidar principle for identifying contamination of a sensor. That status determination depends on two indicators that are based on signals received and sent by the sensor. The indicators are weighted with weighting factors and linked to individual probabilities, wherein a statement about sensor decontamination is derived from the probability if a preset threshold value is unmet or exceeded for a preset length of time. The set length of time for this is greater at a low vehicle speed than at a high vehicle speed. Used as indicators are an object stability, which gives a ratio of detection results for a target object selected for lengthwise vehicle control, and a total of all objects detected during one measurement.

In addition, DE 10 2012 112 987 B3 discloses an optoelectronic sensor that detects and determines the status of objects in a surveillance area. The sensor has an evaluation unit that is designed to determine an angle-dependent view blockage measurement for a view blockage in the direction of a light beam sent out from the sensor.

US 2019/0 107 609 A1 describes a Lidar device with a foreign material detector that recognizes a blocked status of a transmission window on the Lidar device based on a signal-noise ratio measurement.

In addition, U.S. Pat. No. 10,317,534 B2 describes a Lidar system that has a view field divided into segments. The noise level is measured in each of the segments, and sensitivity is adjusted depending on the measured noise level in each segment.

SUMMARY

The invention is intended to provide a better method and a better device than with the prior art for identifying contamination on a protective screen of a Lidar sensor and an application of such a device.

The invention achieves this goal by means of a method, a device, and an application having the features presented in the claims.

Advantageous embodiments of the invention are the object of the subordinate claims.

In the method according to the invention for identifying contamination on a protective screen of a Lidar sensor, a detection region of the Lidar sensor is divided into multiple sectors, and determination takes place by sector as to whether there is any contamination on the protective screens in each sector. To do this, a sector background noise is determined in each sector and a detection region background noise is determined in the remaining detection region or the entire detection region, wherein it is inferred that there is contamination in the respective sector if the sector background noise is significantly lower than the detection region background noise. Alternatively or additionally, in each sector a sector background noise is determined at various sensitivities of a receiver on the Lidar sensor, wherein it is inferred that there is contamination in the respective sector if a sector background noise detected at a higher sensitivity is not significantly higher than a sector background noise detected at a lower sensitivity.

Here the terms "significantly lower" and "significantly higher" are understood to mean that a difference between the respective compared values is at least detectable and/or higher than a preset threshold value.

Contamination or dirt on the protective screen or front screen of a Lidar sensor causes degradation of the Lidar sensor's performance and therefore decreased accuracy and availability of data for the system operating with the Lidar sensor, such as an automated, in particular highly automated or autonomously operating vehicle and/or robot. Detection of contamination on the protective screens of the Lidar sensor represents a challenge for such systems, in a Level 3+ autonomously operating vehicle, for example.

Lidar sensors send out a laser pulse or laser beam and detect its reflections from objects within a detection region. If there is contamination on the protective screen, a received input of reflected light or background light is reduced. At a given sensitivity of the Lidar sensor's receiver, the background light defines a noise behavior of a Lidar system containing the Lidar sensor. If there is contamination, it decreases the amount and intensity of that noise.

The method makes it possible to reliably detect the aforementioned degradations of the Lidar sensor's performance caused by contamination of the protective screen. Appropriate measures can then be taken to ensure and/or increase the accuracy and availability of data from systems using Lidar sensors.

If contamination is detected by comparing the sector background noise at different sensitivities of the Lidar sensor's receiver, spatial inconsistencies are weighted less heavily, because a sector is compared first with itself, and that comparison takes place in short time intervals of 100 ms, for example, at a scanning frequency of 10 Hz. Therefore, the effects of shadows or interference sources have less influence on the result.

The choice of the threshold value used for comparison depends, for example, on the Lidar sensor's design and/or on a desired degree of accuracy in the system's design. In other words, for especially conservatively designed so-called Level 4 systems for autonomously operated vehicles or robots, for example, a lower threshold value is selected than for so-called Level 2 systems, with which a driver or operator is available to take over control of movement. Alternatively or additionally, the choice of the threshold value depends, for example, on a desired application area for the data from the system using the Lidar sensor. In this regard, for example, highways in southern states of the U.S.A. have less sensitive parameters than highways in Scandinavian countries.

In one possible embodiment of the method, alternatively or additionally there is determined to be contamination in a respective sector if a sector background noise detected at a higher sensitivity is not at least 10% higher than the sector background noise detected at a lower sensitivity.

In one possible embodiment of the method, there is determined to be contamination in a respective sector if the sector background noise is at least 10% lower than the detection region background noise.

In another possible embodiment of the method, the sector background noise and the detection region background noise are determined based on a background light intensity detected for a signal transit time with at least one scan between sending out one infrared laser pulse and receiving one reflection of the infrared laser pulse. This allows for exceptionally easy and reliable determination of the sector background noise and the detection region background noise.

In another possible embodiment of the method, the intensity of the background light is determined over the entire signal transit time and an effective intensity value is generated. This also allows for exceptionally easy and reliable determination of the sector background noise and the detection region background noise.

In another possible embodiment of the method, the detection region background noise is determined based on determining a noise level of the background light in the remaining detection region or the entire detection region. This allows for exceptionally easy and reliable determination of the detection region background noise.

In another possible embodiment of the method, the sector background noise is determined based on determining a noise level of the background light for exactly one scan done in the respective sector. This allows for exceptionally easy and reliable determination of the sector background noise.

In another possible embodiment of the method, the sector background noise is determined based on determining a noise level of the background light for some or all of the scans done in the respective sector. This also allows for exceptionally easy and reliable determination of the sector background noise.

In another possible embodiment of the method, the sector background noise is determined as follows: all inputs received by the receiver in the respective sector are integrated, reflection inputs received by the receiver from reflections of multiple infrared laser pulses in the respective sector are integrated, and a total noise input for the respective sector is determined from the difference between the integrated received inputs and the integrated reflection inputs. This also allows for exceptionally easy and reliable determination of the sector background noise, wherein any existing dependency on a distance to the first received infrared laser pulse can be excluded.

In another possible embodiment of the method, the sensitivity of the receiver is set based on an operating point adjustment or by changing an internal amplification factor of the speaker. Increasing the sensitivity of the Lidar sensor also increases the background noise generated by the background light.

The device for detecting contamination on a protective screen of a Lidar sensor according to the invention is characterized in that a detection region of the Lidar sensor is divided into multiple sectors and a data processing unit is configured to detect, by sector, whether there is contamination on the protective screens in the respective sectors. To do this, the data processing unit determines a sector background noise in each sector and a detection region background noise in the remaining detection region or the entire detection region, and infers that there is contamination in the respective sector if the sector background noise is significantly lower than the detection region background noise. Alternatively or additionally, in each sector the data processing unit determines a sector background noise at various sensitivities of a receiver of the Lidar sensor, and infers that there is contamination in the respective sector if a sector background noise detected at a higher sensitivity is not significantly higher than a sector background noise detected at a lower sensitivity.

The device makes it possible to reliably detect the aforementioned degradations of the Lidar sensor's performance caused by contamination of the protective screen. Appropriate measures can then be taken to ensure and/or increase the accuracy and availability of data from systems using Lidar sensors.

In one possible [embodiment] of the aforementioned device in a vehicle and/or robot, the at least one Lidar sensor is intended for surroundings detection. Using the device, contamination of the protective screen for the at least one Lidar sensor that would affect surroundings detection can be easily and reliably detected.

In one possible embodiment of the application, an automated, in particular highly automated or autonomous, vehicle and/or robot is operated based on data detected by the at least one Lidar sensor, and when at least one instance of contamination on the protective screen of the at least one Lidar sensor is detected, automated operation is reduced and/or at least one measure is taken to remove the at least one instance of contamination. This can significantly increase the reliability and safety of operating the vehicle and/or robot.

DESCRIPTION OF THE FIGURES

Examples of the invention are explained in more detail below, with reference to figures.

The figures show.

DETAILED DESCRIPTION

The same items are marked with the same references in all figures.

Figure 1:
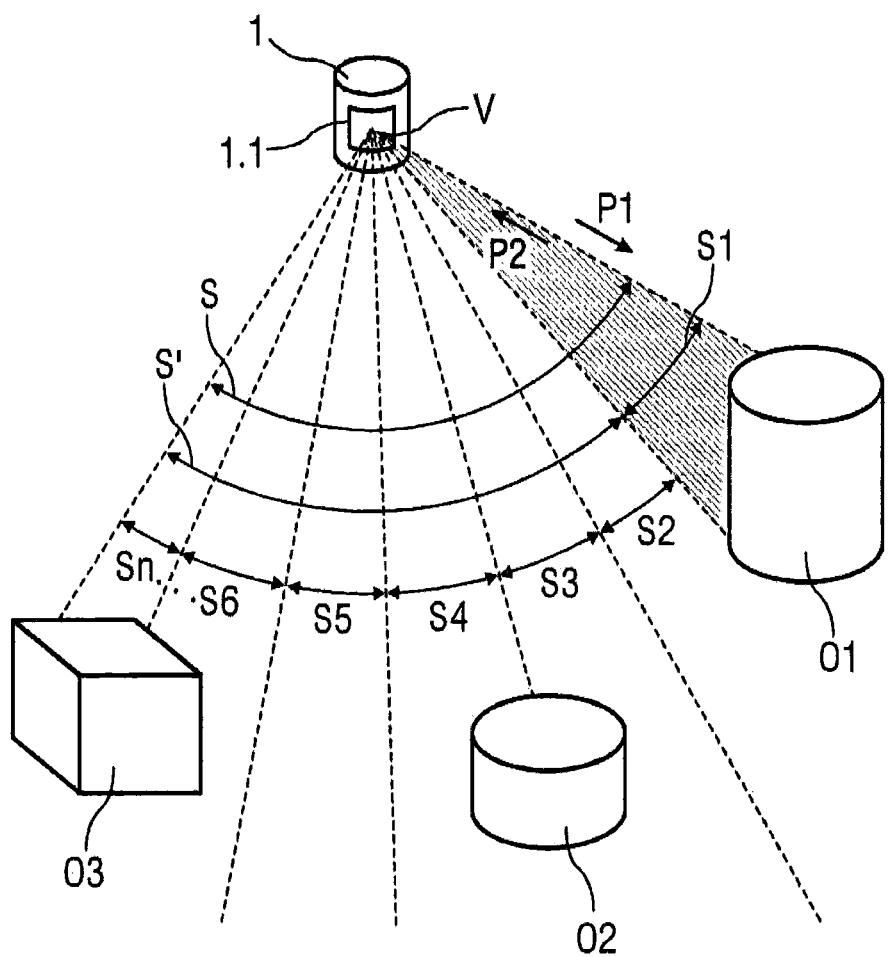
FIG. 1 schematic perspective view of a Lidar sensor and multiple objects.
Figure 2:
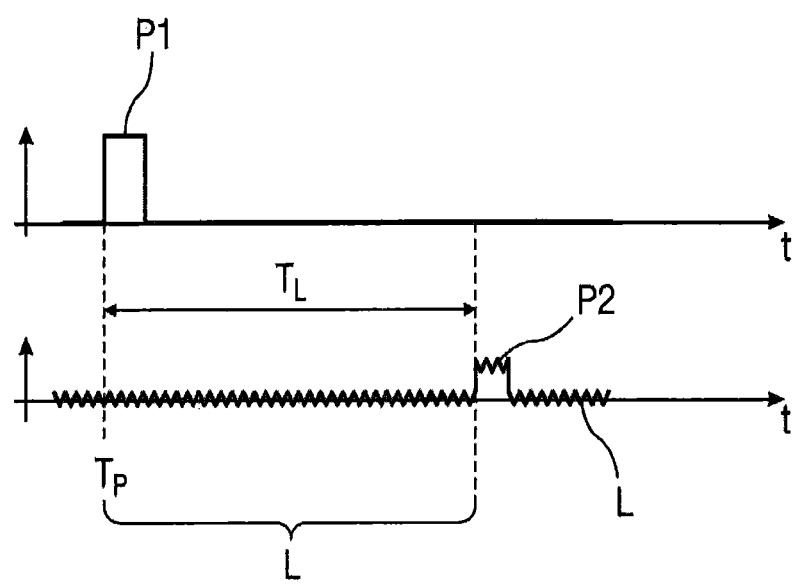
FIG. 2 schematic of a time sequence with signals sent and received by a Lidar sensor.

FIG. 1 shows a perspective view of a Lidar sensor 1 and multiple objects O1 to O3. FIG. 2 shows the transmission of an infrared laser pulse P1 sent by a Lidar sensor 1 and the transmission of a reflection P2 received by a receiver on the Lidar sensor 1 as a function of the time t. The reflection P2 originates from the reflection of the laser pulse P1 sent to at least one object O1 to O3.

The Lidar sensor 1 is, for example, a component on a vehicle and/or robot that is not shown here and is intended for surroundings detection. Based on data detected by the Lidar sensor 1, an automated, in particular highly automated or autonomous, vehicle and/or robot is operated.

The Lidar sensor 1 comprises a laser assembly, not shown here, for generating infrared laser pulses P1 that are sent to an area to be scanned. The laser assembly can include a single laser diode or a laser diode array.

The Lidar sensor 1 also comprises a receiver configured as a photo detector assembly, not shown here, for detecting incoming infrared pulses, i.e., the reflections P2, that are reflected back from the area to be scanned. The photo detector assembly can include a single receiver diode or a receiver diode array.

The laser pulses P1 and reflections P2 can be transmitted directly or through a deflector unit, not shown here, from the laser assembly to the area or from the area to the receiver. The deflecting device can be a rotating mirror, rotating prism, and/or array with movable micro mirrors.

The laser assembly and receiver are located behind at least one protective screen 1.1, also called a protective window or Lidar window, and thereby protected as much as possible against mechanical damage and the entry of foreign materials. The Laser pulses P1 are sent by the laser assembly through the protective screen 1.1 to the area being scanned. The reflections P2 travel from the area through the protective screen 1.1 to the receiver.

A scanning region or detection region S of the Lidar sensor 1 is divided into multiple sectors S1 to Sn. The infrared Laser pulse P1 generated by the laser assembly is directed through the protective screen 1.1 to the area being scanned and reflected back by the objects O1 to O3 located there. The reflected infrared laser pulse, i.e., the reflection P2, travels through the protective screen 1.1, or through another protective screen that is not shown, to the receiver.

If there is contamination V on the protective screen 1.1, or on the other protective screen that is not shown, in the area of a sector S1, the received input of reflection P2 and the received input of a background light L are reduced in that sector S1. This also causes a reduction in the noise level of the background light L in that sector S1. That noise level is also designated herein as background noise.

This background noise, together with a sensitivity of the Lidar sensor 1, determines a noise behavior of the Lidar sensor 1. The sensitivity of the Lidar sensor 1 is determined based on the sensitivity of the receiver configured as a photo detector assembly, for example. The background noise can be seen in FIG. 2 in the time sequence of the received reflection P2 and the background light L.

As shown in FIG. 2, the laser assembly generates a laser pulse P1 for scanning the area at a certain time point $T_P$. This is sent out to the area to be scanned. In the surroundings detection performed by the Lidar sensor 1, the individual sectors S1 to Sn in the detection region S are scanned respectively with multiple Lidar pulses P1.

The laser pulses P1 are reflected back from an object O1 to O3 located in the area as reflection P2 to the Lidar sensor 1. After a signal transmission time $T_L$ that depends on the distance between the respective object O1 to O3 and the Lidar sensor 1, the corresponding reflection P2 reaches the receiver of the Lidar sensor 1 and is detected by it as a received pulse.

In the signal transmission time $T_L$ between sending out a laser pulse P1 and receiving the related reflection P2, the receiver detects the noise of the background light L. A noise level of the background light L is determined, for example, by detecting an intensity of the background light L over a preset length of time, such as over the signal transmission time $T_L$, and calculating an effective value of the intensity detected during that length of time.

The background noise in a sector S1 to Sn, hereinafter designated as sector background noise, is determined based on determining a noise level of the background light L for exactly one scan done in the respective sector S1 to Sn. Alternatively, the sector background noise is determined based on determining a noise level of the background light L for some or all of the scans done in the respective sector S1 to Sn.

Alternatively, the sector background noise is determined as follows: all inputs received by the receiver in the respective sector S1 to Sn are integrated and reflection inputs received by the receiver from reflections P2 of multiple infrared laser pulses P1 in the respective sector S1 to Sn are integrated. Next, a total noise input describing the sector background noise for the respective sector S1 to Sn is determined from the difference between the integrated received inputs and the integrated reflection inputs, so that any existing dependency on the distance to the first received reflection P2 can be excluded.

A test to see whether contamination V is present on the protective screen 1.1 is performed by sector, in particular by a data processing unit not shown here. It tests to see whether there is contamination V on the protective screen 1.1 in the respective sector S1 to Sn.

This test is described below using the example of sector S1. The test is conducted in similar fashion for the other sectors S2 to Sn.

During a scan of the entire detection region S, the sector background noise in the sector S1, and also a detection region background noise in the entire detection region S or in a detection region S' comprising the remaining sectors S2 to Sn without the sector S1, is detected. The detection region background noise is also determined based on determining a noise level of the background light L in the remaining detection region S' or the entire detection region S. It is inferred that there is contamination V of the protective screen 1.1 in the sector S1 if the sector background noise is significantly lower than the detection region background noise.

Alternatively or additionally, the sector background noise in the sector S1 is determined at different points in time at different sensitivity settings of the receiver. In that case, the sensitivity of the receiver is set, for example, based on an operating point adjustment or by varying an internal amplification factor of the speaker. In particular, measurements are taken at different sensitivities in short time intervals, such as intervals of 100 ms at a scanning frequency of 10 Hz. It is inferred that there is contamination V of the protective screen 1.1 in the sector S1 if the sector background noise detected at a higher sensitivity is not significantly higher than the sector background noise detected at a lower sensitivity. The determination of contamination V in this embodiment has the advantage that spatial inconsistencies have only low effects on the measurement result, because a sector S1 is compared first with itself, and that comparison takes place in short time intervals due to the scanning frequency. The effects of shadows or interference sources therefore have less influence on the measurement result.

When at least one instance of contamination V is detected on the protective screen 1.1 of the Lidar sensor 1, automated operation can be reduced for an application in a vehicle and/or robot and/or at least one measure can be taken to remove the at least one instance of contamination V.

LIST OF REFERENCE INDICATORS

1 Lidar sensor
1.1 Protective screen
L Background light
O1 to O3 Object
P1 Laser pulse
P2 Reflection
S Detection region
S1 to Sn Sector
S' Remaining detection region
t Time
$T_L$ Signal transmission time
$T_P$ Time point
V Contamination

The invention claimed is:

1. A method for identifying contamination on a protective screen of a Lidar sensor, comprising:
dividing a detection region of the Lidar sensor into multiple sectors, wherein it is determined by sector whether there is contamination on the protective screen in the respective sector, and wherein in each sector a sector background noise is determined at various sensitivities of a receiver on the Lidar sensor, wherein it is inferred that there is contamination in the respective sector if a sector background noise detected at a higher sensitivity compared with a sector background noise detected at a lower sensitivity does not show a significantly higher level of sector background noise, wherein when contamination is inferred the contamination is removed from the protective screen.

2. The method as claimed in claim 1, wherein the sector background noise is determined in each sector and a detection region background noise is determined in the remaining detection region or the entire detection region, wherein it is inferred that there is contamination in the respective sector if the sector background noise is significantly lower than the detection region background noise.

3. The method as in claim 2, wherein the sector background noise and the detection region background noise are determined based on a background light intensity detected for a signal transit time with at least one scan between sending out one infrared laser pulse and receiving one reflection of the infrared laser pulse.

4. The method as in claim 3, wherein the intensity of the background light is determined over the entire signal transit time and an effective intensity value is generated.

5. The method as in claim 4, wherein the detection region background noise is determined based on determining a noise level of the background light in the remaining detection region or the entire detection region.

6. The method as in claim 4, wherein the sector background noise is determined based on
determining a noise level of the background light for exactly one scan done in the respective sector or
determining a noise level of the background light for some or all of the scans done in the respective sector.

7. The method as in claim 4, wherein the sector background noise is determined as follows:
all inputs received by the receiver in the respective sector are integrated,
reflection inputs received by the receiver from reflections of multiple infrared laser pulses in the respective sector are integrated, and
a total noise input describing the sector background noise for the respective sector is determined from the difference between the integrated received inputs and the integrated reflection inputs.

8. The method as in claim 1, wherein the receiver sensitivity is set based on an operating point adjustment or by changing an internal amplification factor of the speaker.

9. A device for identifying contamination on a protective screen of a Lidar sensor, comprising:
a detection region of the Lidar sensor is divided into multiple sectors and
a data processing unit is configured to determine by sector whether there is contamination on the protective screen in the respective sector, wherein the data processing unit:
in each sector determines a sector background noise at various sensitivities of a receiver of the Lidar sensor, and infers that there is contamination in the respective sector if a sector background noise detected at a higher sensitivity is compared with a sector background noise detected at a lower sensitivity that does not show a significantly higher level of sector background noise,
wherein when contamination is inferred the contamination is removed from the protective screen.

10. The device as in claim 9 wherein in a vehicle and/or a robot, the at least one Lidar sensor is intended for surroundings detection.

11. The device method as in claim 10, wherein
based on data detected by the at least one Lidar sensor, an automated or autonomous vehicle and/or robot is operated and
when at least one instance of contamination is detected on the protective screen of the at least one Lidar sensor, automated operation is reduced.

12. The device as claimed in claim 9, wherein the data processing unit determines a sector background noise in each sector and determines a detection region background noise in the remaining detection region or the entire detection region, and infers that there is contamination in the respective sector if the sector background noise is significantly lower than the detection region background noise.

* * * * *